March 17, 1959     G. H. WAKEFIELD     2,877,965
JET INLET DIFFUSER FOR SUPERSONIC FLYING WING
Filed April 22, 1952     7 Sheets-Sheet 1
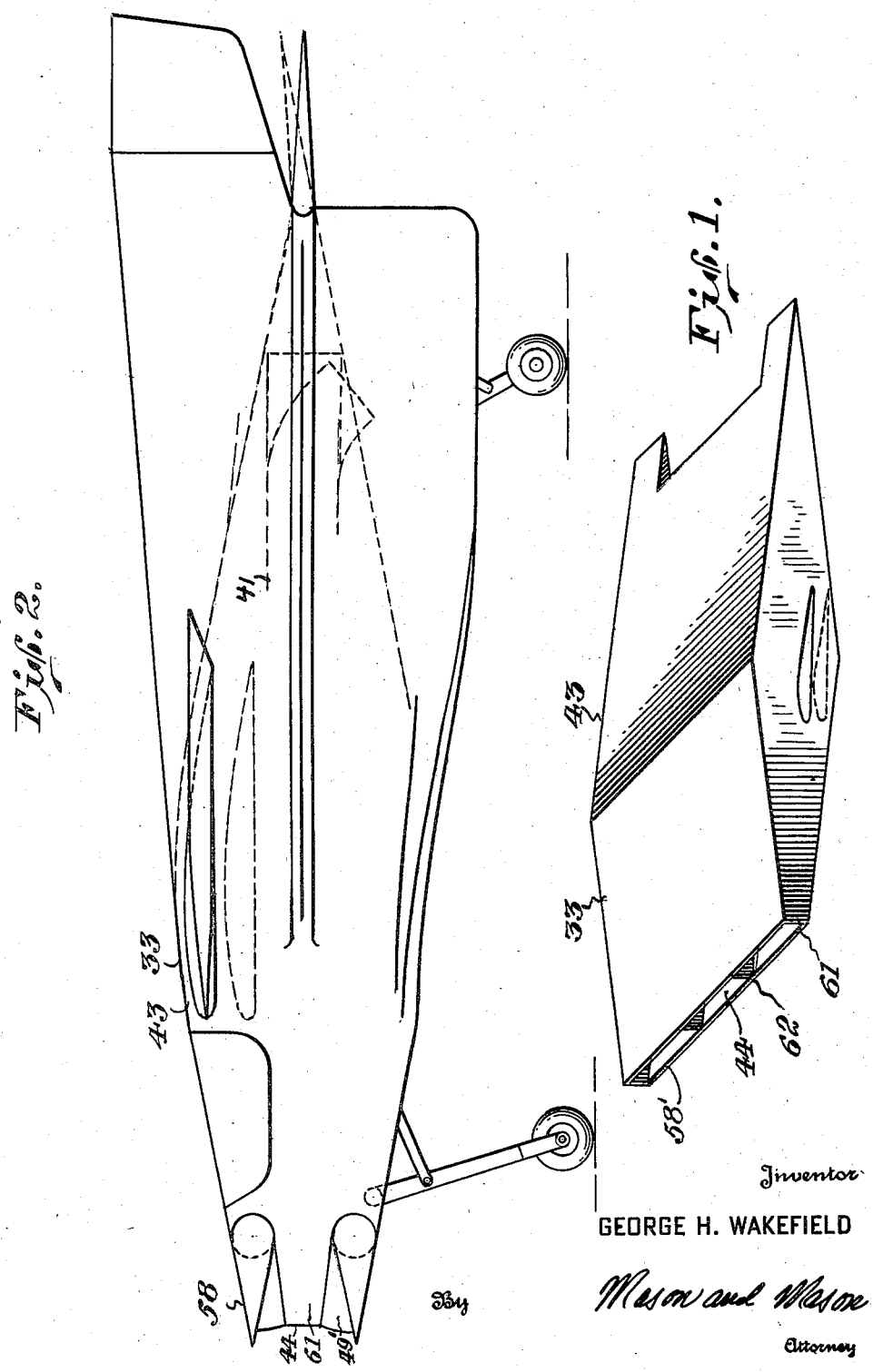
Inventor
GEORGE H. WAKEFIELD
By Mason and Mason
Attorney

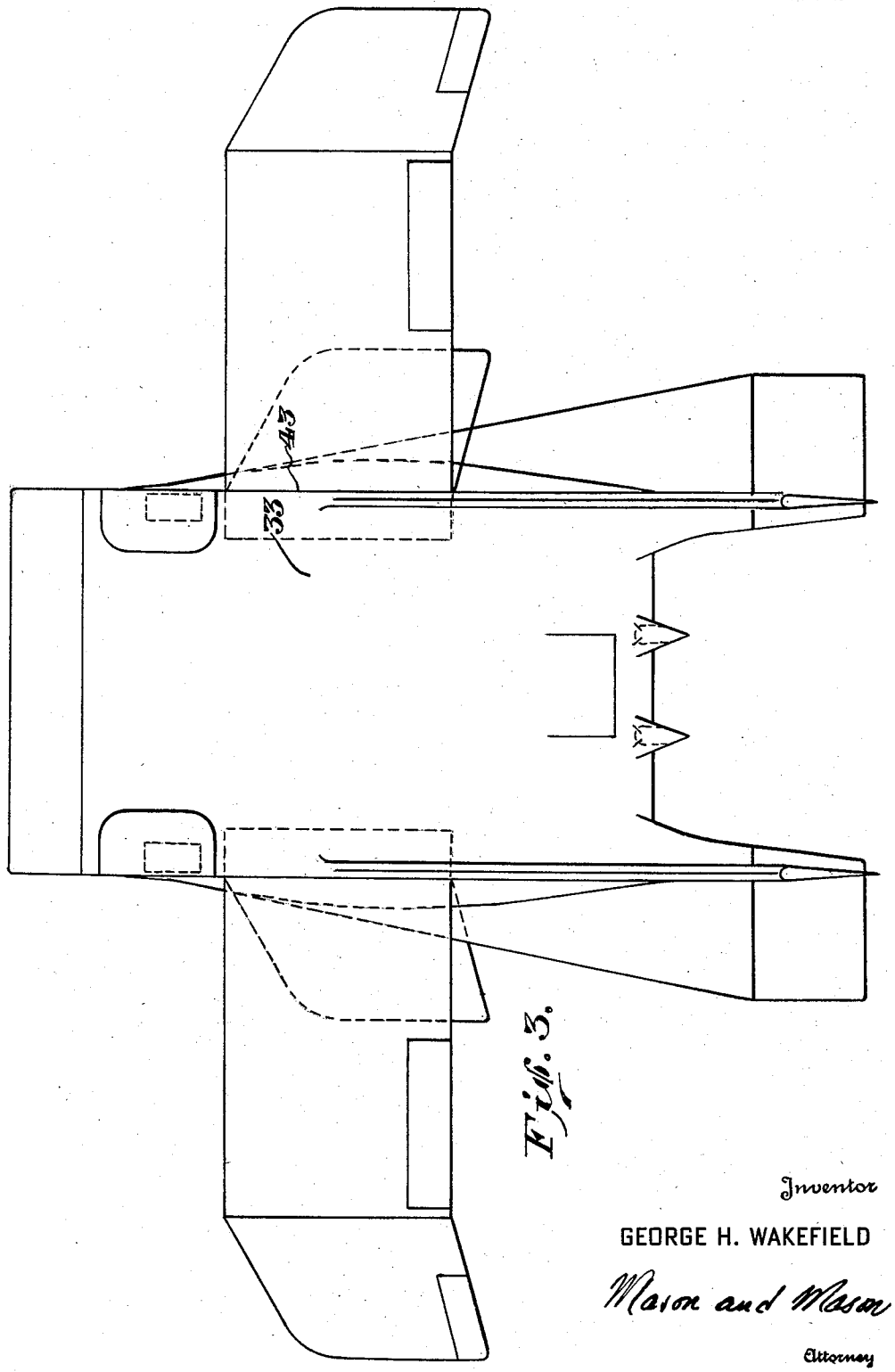

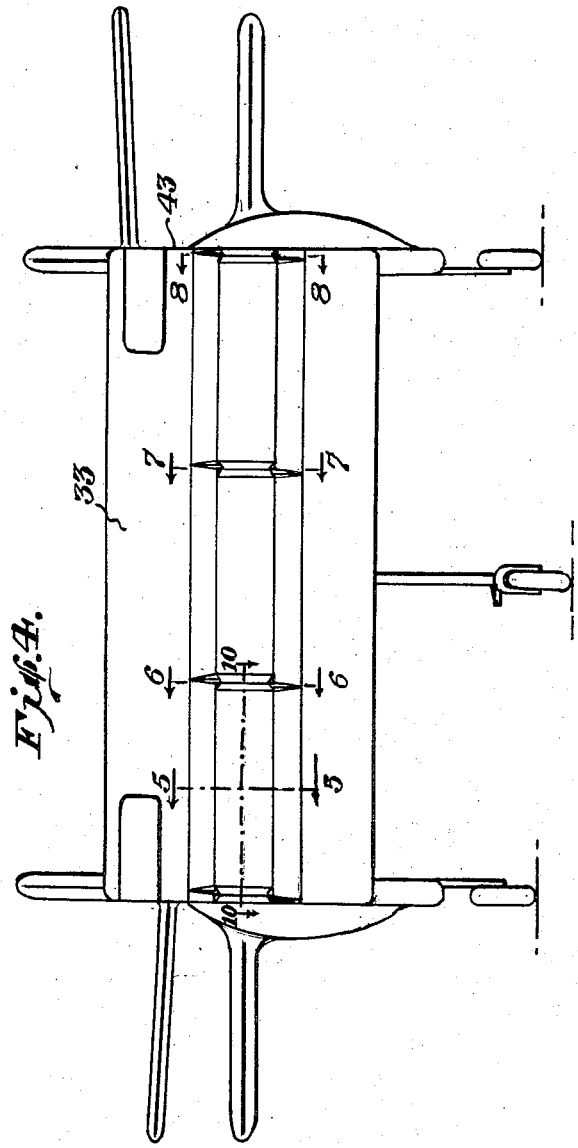

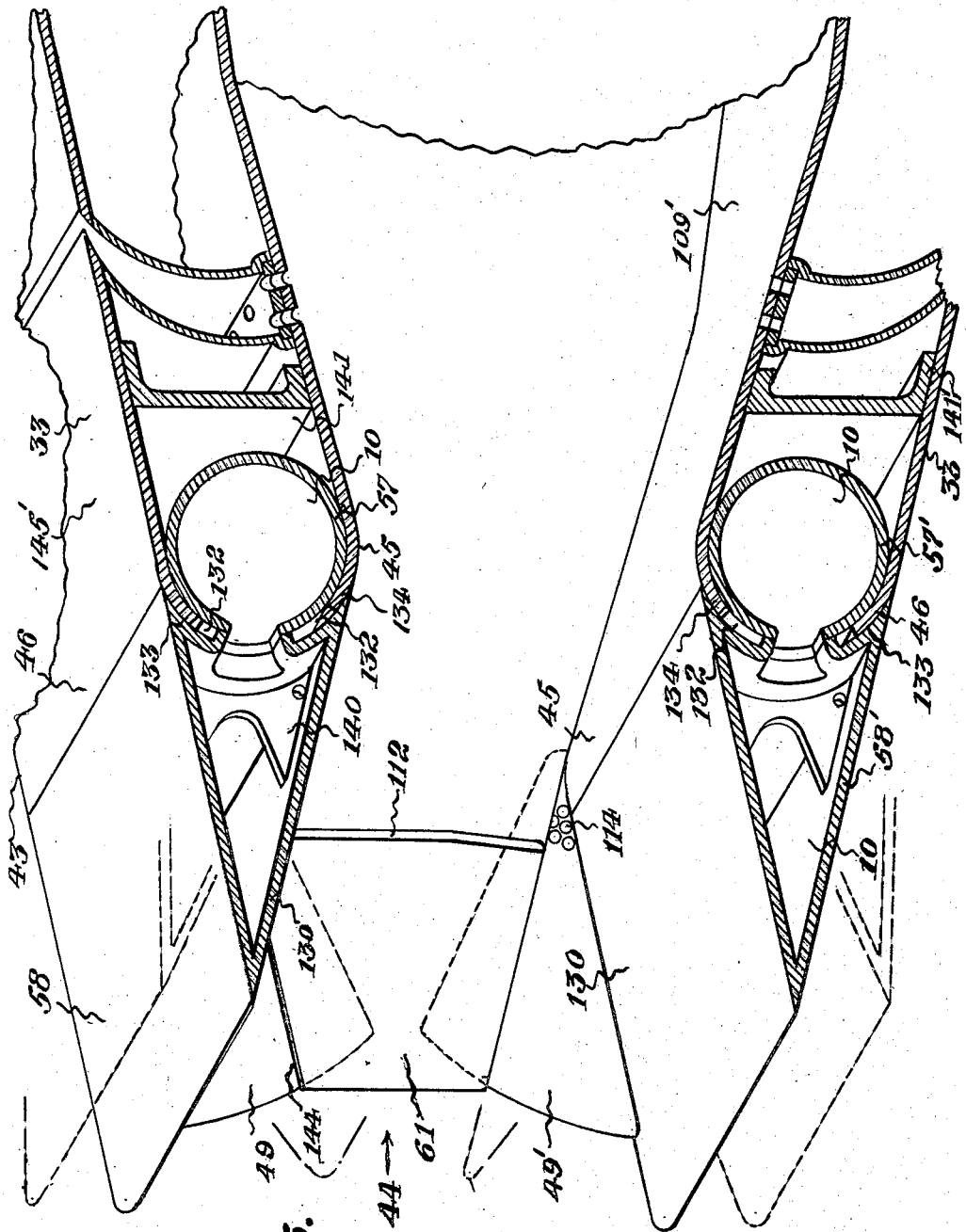

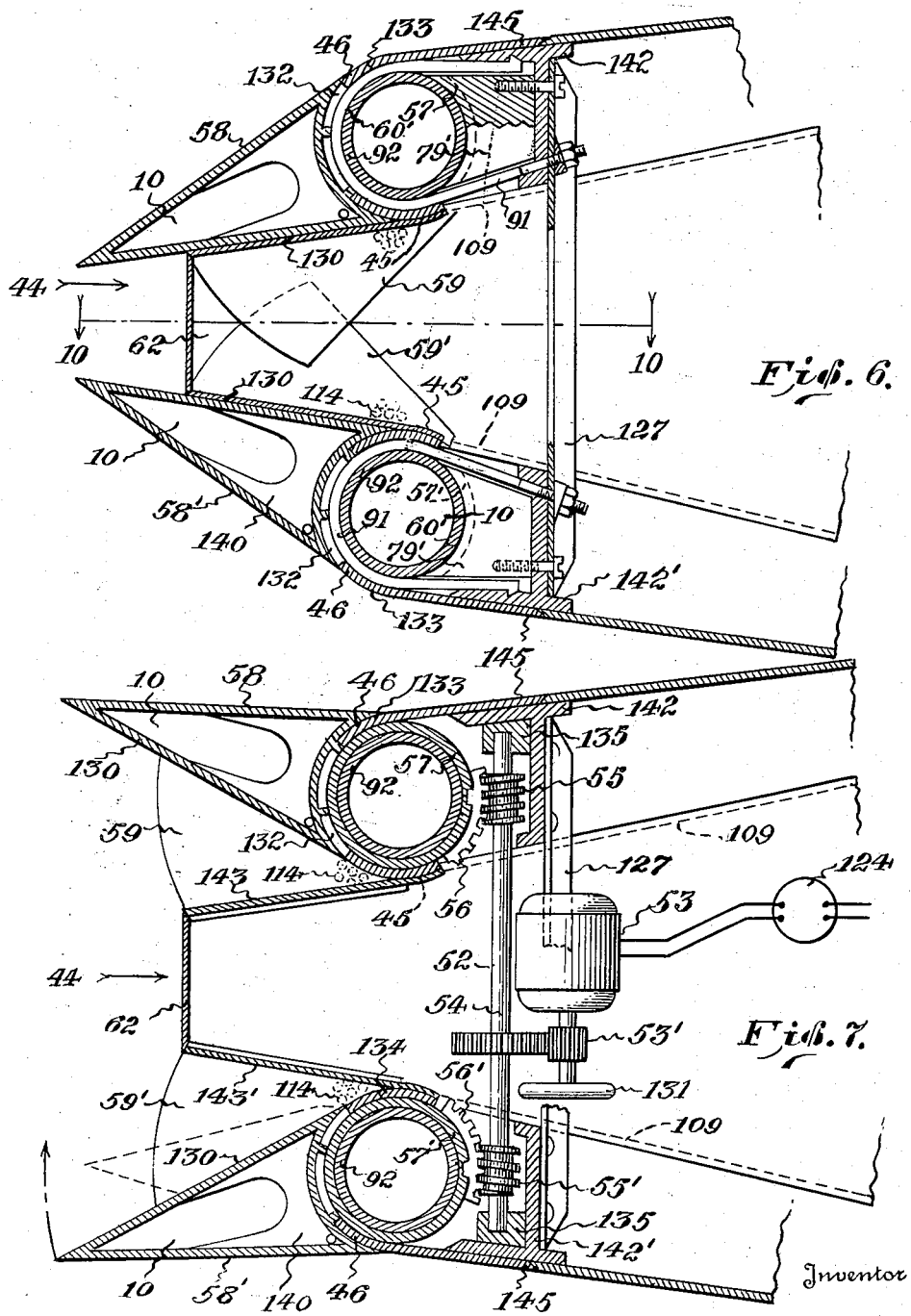

Inventor
GEORGE H. WAKEFIELD

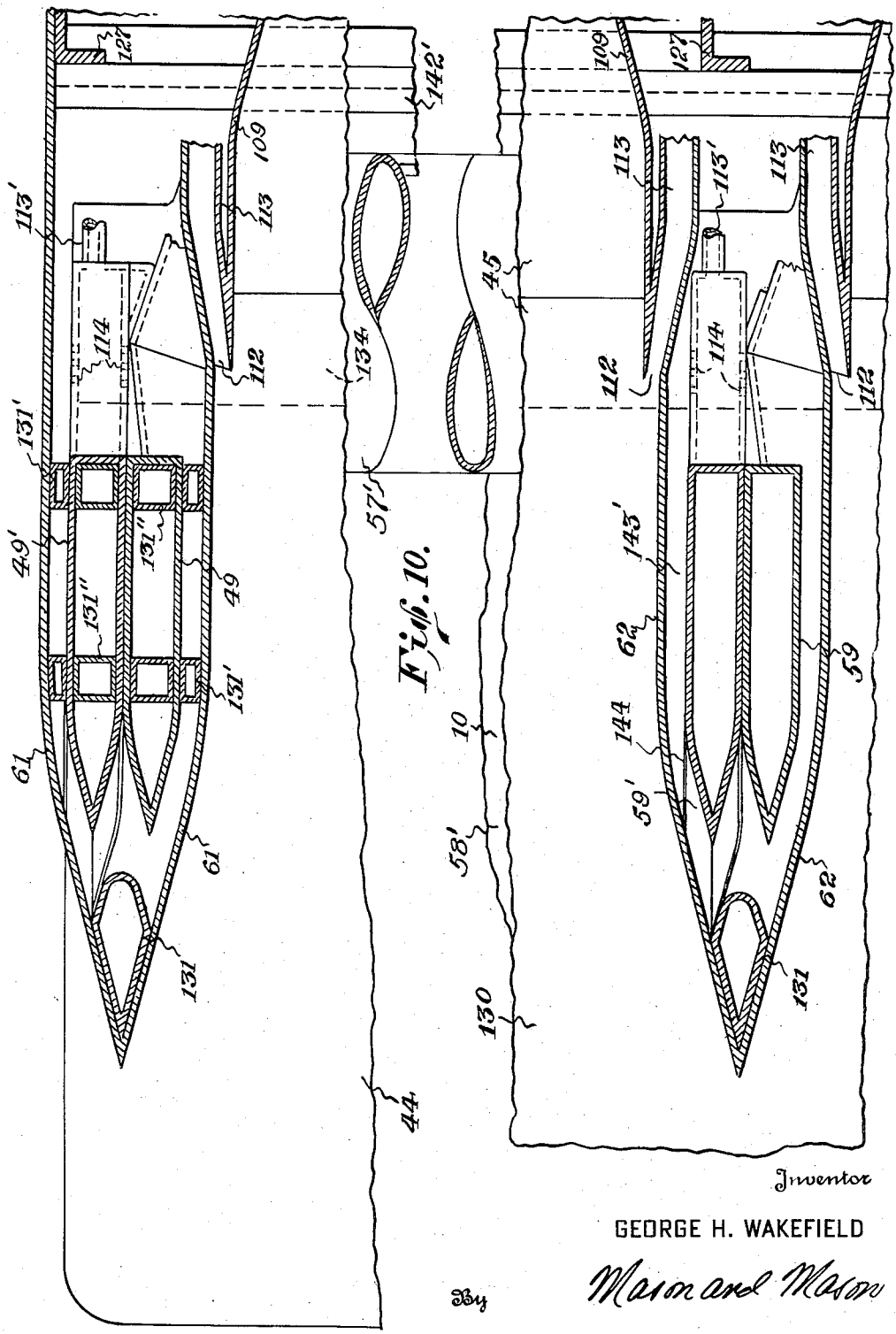

United States Patent Office 2,877,965
Patented Mar. 17, 1959

2,877,965
JET INLET DIFFUSER FOR SUPERSONIC FLYING WING

George H. Wakefield, Takoma Park, Md.

Application April 22, 1952, Serial No. 283,621

7 Claims. (Cl. 244—15)

This invention relates to improvements in aircraft and particularly in aircraft designed to fly at both subsonic and supersonic speeds.

It is an object of this invention to provide an adjustable jet air intake diffuser which will improve the efficiency of an aircraft at varying flight speeds in both the subsonic and supersonic range. A further object is to reduce the form drag of an aircraft by a uniform reduction of the disruption to the streamlined flow with its undesirable pressures and turbulence about the aircraft. A further object is to reduce the skin friction by reducing the aircraft's skin area to a minimum and permitting substantially parallel upper and lower wing skins. A further object is to provide an adjustable diffuser which, in operation, compensates for variations of air volume requirements, variations in air velocity, air density, and shock characteristics, and will not choke off the jet air supply under static and near static conditions. A further object is to foster rigidity and eliminate chatter in an adjustable air inlet diffuser. A further object is to provide a rectangular variable air inlet diffuser in the leading edge of a wing substantially free of shock-wave interference, i. e., a diffuser which has excellent internal and external flow characteristics at both subsonic and supersonic speeds, and which may be adapted for a flat plate or the like extending forward from the diffuser to provide annular inlet flow conditions and further to prevent shock-wave interference.

These and other objects and advantages of the invention will be apparent from the following specification and accompanying drawings.

Figure 1 is a diagrammatic perspective view of a flying wing with air inlets.

Figures 2, 3 and 4 show the side, top, and front views of a flying wing incorporating the invention.

Figure 5, taken on line 5—5 of Figure 4, is a vertical section perspective view through the adjustable air inlet diffuser at a duct center.

Figure 8:
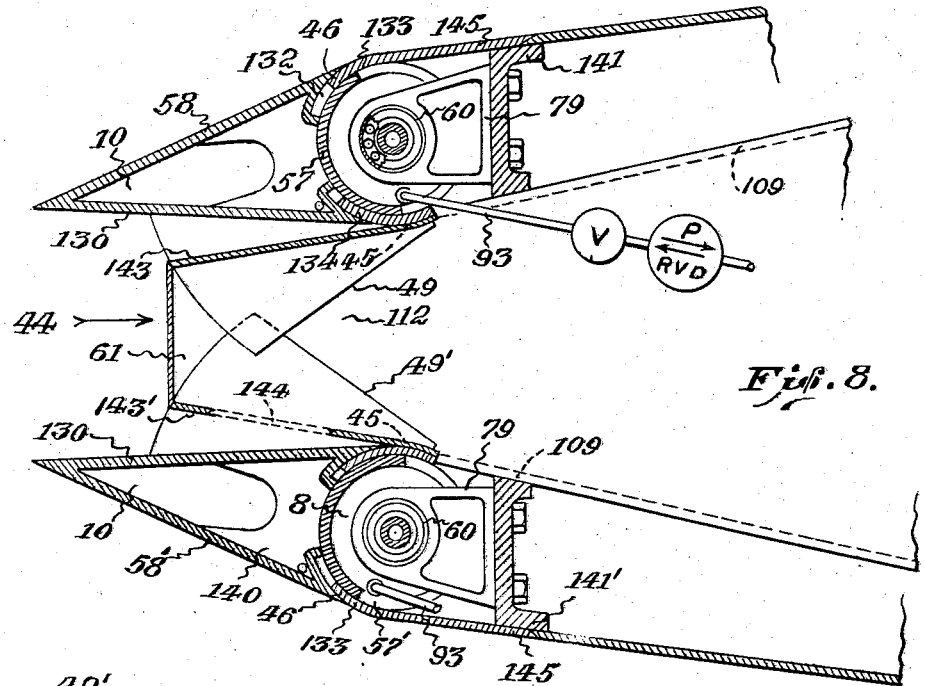

Figures 6, 7 and 8 are other vertical sections, through 6—6, 7—7 and 8—8 respectively in Figure 4, showing different diffuser adjustment together with important stationary structure and operating mechanism.

Figure 9:
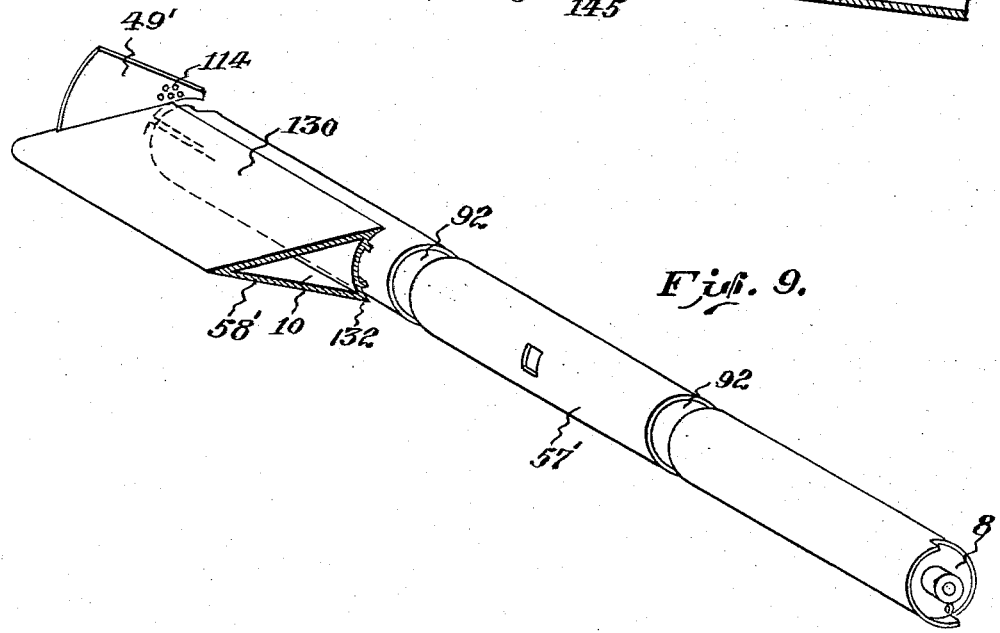

Figure 9 is a fragmentary perspective view of the lower diffuser torque tube assembly shown in Figures 5 through 10.

Figure 10 is a fragmentary horizontal section, through the inlet on line 10—10 of Figures 4 and 6. Structure is shown more clearly by vertical expansion of relative dimensions.

The conventional subsonic wing is an aerodynamic misfit when operating at supersonic speeds. Where high supersonic speeds are desired in an aircraft, subsonic structural limitations required to maintain the aircraft during subsonic portions of the flight frequently have a substantial adverse effect on performance at supersonic flight speeds. It is thus evident that to obtain peak efficiency and peak performance at supersonic speeds, all objectionable subsonic shapes must be eliminated. Since my invention provides supersonic shapes having a high degree of compactness, i. e., a higher volume to skin surface ratio, not found in the conventional supersonic aircraft, it is logical to employ such compactness to provide space for the retraction, wherever possible, of objectionable subsonic structure and otherwise to minimize the air resistance or drag of the aircraft. Aside from subsonic structure, much air resistance is caused by leading edges. Thus the use of the entire leading edge of a supersonic aircraft as a jet intake can greatly reduce the craft's air resistance, particularly at design speed and design altitude. Further reduction of drag can be obtained and the performance of the aircraft improved at both subsonic and supersonic speeds by adjustment of opening of the leading edge air inlet.

According to the invention there is provided an air inlet diffuser mechanism 44 for aircraft comprising a pair of spaced elongated upper and lower diffuser members, 58 and 58', said members being wedge-shaped in cross section, each member having a wedge edge pointing in the forward direction of travel of the aircraft, bearings 60 and 60' mounting said members to the leading edge of the aircraft wing, control means 52 for adjusting the angular position of each diffuser member on said bearings, and an end plate 49, 49', 59, 59' mounted on each diffuser member and extending in overlapping relationship and in substantially vertical planes toward the other diffuser member.

The operating mechanism 52 for the adjustable inlet diffuser 44 may be manual, electrical or hydraulic. A combined manual and electrical means is shown in Figure 7. A reversible electric motor 53 is connected through a speed reducer 53' or directly to shaft 54 upon which is mounted a right hand and left hand worm 55, 55'. These worms 55, 55' are meshed with and operate right hand and left hand worm wheel sectors 56, 56' which are secured to and rock the upper and lower torque tubes or shafts 57, 57' respectively. To these are securely attached the upper and lower adjustable inlet diffuser members, 58, 58'. When the shaft 54 is rotated in one direction the inlet area of the diffuser 44 increases and when it is rotated in the other direction this area decreases. The long wedge shaped members 58, 58' extend the full length or nearly the full length of the leading edge 46. The bearings 135 that support shaft 54 in operating position are mounted on any suitable spar members 142, 142'. Upright frame members 127 rigidly secure these two spar members in vertical spaced relation. The geared part of the operating mechanism 52 may be situated out of the way within the partitions 62 or ends 61 (Figures 5 to 8) at the side of or between the air ducts 109 or 109' and near the leading edge 46 of the supersonic airfoil 33. The manually operated wheel 131 is to be used to adjust the inlet diffuser area in case of electric motor 53 failure.

I have shown the inside faces 130 of the diffuser members 58, 58' straight. In fact this face 130 should be made straight or convexly curved in a manner to produce the most economical ram compression at supersonic design speed conditions and near design speed conditions. The area of the throat 45 for all diffuser adjustments is nearly constant. Its shape is formed by the rounded shaft members 57, 57' the adjoining duct 109, or 109' and the diffuser face members 130. The diffuser adjusting motor 53 may be operated directly by the pilot or automatically operated by a governor 124 or both. This governor 124 is sensitive to draft speed and air density by means common to the art. It adjusts the inlet diffuser 44 accordingly by operating the reversible adjusting motor 53. An extra fuel storage compartment 10 may be had within the upper and lower hollow diffuser assemblies 57, 58 and 57', 58'. As shown in Figure 8 any suitable flexible tube and coupling 93 attached to the torque tube end 8 supplies fuel in the direction of the arrow RVD through the valve V to these storage compartments 10 by means common to the art, the fuel subsequently being removed for use in the direction of the arrow P.

Between the wedge shaped members 58, 58' and their respective shafts 57, 57' curved slots 132 are provided to receive the curved wing skin 133 and the curved duct ends 134. The diffuser members 58, 58' are internally stiffened by any suitable bracing 140. To these members 58, 58' are attached suitable end plates 49, 49' (Figures 8 and 9) and partition plates 59, 59' (Figures 6 and 7) which slide into and out of the hollow diffuser ends 61 and partitions 62 respectively, as the area of the inlet diffuser 44 is adjusted. The tops 143 and bottoms 143' of the diffuser ends 61 and partitions 62 are provided with carefully made slots 144 to admit plates 49, 49', 59, 59' respectively. See Figures 5–10.

The hollow shafts 57, 57' or their equivalent are mounted on suitable end bearings 60 (Figure 8) and line bearings 60' (Figure 6) at desirable intervals. They are rigidly secured to the spar members 141, 141' or 142, 142' by properly spaced bearing brackets 79, 79' as shown in Figures 6, 8, 9. At the partition bearings 60' the torque tubes 57, 57' may be slightly reduced in diameter, or a shaft connecting inner sleeve 92 may be added to maintain strength. This construction would greatly aid in keeping the inside and outside air stream contact surfaces 58, 58', 130, 133 and 134 flush throughout the diffuser 44. Especially will this be so for the line bearing 60' when no partitions 62 are used. Suitable adjustable bearing bands 91 attached to the spar members 142, 142' or to the bearing brackets 79' enable the diameter of shaft 57, 57' to be large by comparison with the thickness of the bearings and give excellent rigidity. See Figure 6. As shown in Figures 5 and 9 the upper and lower movable diffuser assemblies on shafts 57, 57' may be made accessible for repairs or removal, by first removing the leading edge plates 145 or 145'. Or they may be inserted and removed from either end 43 of the supersonic airfoil 33.

There will be an unavoidable increase in surface area at the diffuser ends 61 and partitions 62. At the inside corners where the end plates 49, 49' and partition plates 59, 59' intersect the broad face 130 of the diffuser members 58, 58', a variable area is created. And this variation in area exists even if large fillets are used in these corners. A boundary layer disturbance at these areas might prevent excellent pressure recovery in the diffuser 44 itself. To remedy this condition, should it occur, one or more small boundary layer bleeders 112 may be located in the side of the diffuser ends 61 and in the sides of the partitions 62. See Figures 5 and 10. Air collected in bleeder 112 is conducted into duct 113 (Figure 10).

A self-adjusting corner bleeder is shown in Figures 5 to 7, 9 to 10. It consists of a series of properly spaced holes or scoops 114 in the end plates 49, 49' and partition plates 59, 59'. As the inlet diffuser 44 is opened and more and more flat area is exposed to the air stream, a proportionately increasing number of holes 114 are uncovered. These admit more and more troublesome boundary air into the plates 49, 49', 59, 59', and from here into the flexibly connected duct 113' (Figure 10). When the diffuser 44 has its minimum area inlet adjustment as shown in Figure 6, no air is bled off through these holes 114. They are all covered by the diffuser ends 61 and partitions 62. The small percentage of bled air, if any, produced in the diffuser 44 need not be wasted. This air under some pressure is conducted from ducts 113, 113' and used to cool engine parts, or to allay surface turbulence in any suitable manner.

The advantages gained by using my inlet diffuser 44 in combination with a supersonic flying airfoil 33 are manifold: At take-off the diffuser adjustment may be similar to that shown in Figure 8. With this adjustment the air stream engines 41 receive an ample air supply without high negative pressures in their inlets and ducting 109 or 109'. There is no need for suction relief valves. A spillage, or overflow at the inlet, with the resulting added external drag, is produced at subsonic speeds when a non-adjustable inlet is used. These conditions never exist when the diffuser 44 is used. This diffuser is adjustable to meet all speed conditions. Just the correct amount of ram air is gathered for the air stream engines 41. It is to be noted in Figures 6 and 8 that the diffuser 44 gives the leading edge 46 of the pure supersonic airfoil 33 a somewhat subsonic shape at subsonic speeds—a distinct advantage. The diffuser adjustment shown in Figure 6 is for subsonic design speed conditions. In Figure 5 the diffuser 44 is shown adjusted to meet supersonic design speed conditions. With this ideal and economical diffuser adjustment the external drag is at its minimum, and a smooth air flow is provided into and through the throat 45. A higher maximum supersonic speed may be reached when flying light at high altitudes with the diffuser adjustment shown in Figure 7. (This figure shows the diffuser opening slightly exaggerated to illustrate better the increased air gathering area provided with this adjustment.) The diffuser 44 compensates for craft velocity, air density and engine requirements. If desired, leading edge stagger may be had with this diffuser 44 by shortening the lower edge shaped member 58' as indicated by broken lines in Figure 7.

What I claim is:

1. A leading edge air inlet diffuser mechanism for aircraft including an airfoil, a pair of spaced elongated upper and lower diffuser members, said members being wedge-shaped in cross section, each member having a wedge edge pointing upstream, bearings mounting said members to the upstream edge of said airfoil, control means for adjusting the angular position of each of said members on said bearings, at least one pair of aligned plates disposed in fore and aft vertical planes, said pair including one plate mounted on one of said diffuser members and another plate mounted on the other of said diffuser members, and housing means fixed to said airfoil and extending between said diffuser members, said housing means slidably receiving said pair of plates.

2. A leading edge inlet diffuser construction for aircraft comprising a wing having upper and lower skins, an engine having a supply duct, said duct having upper and lower walls spaced inwardly from said skins, an upper elongated diffuser member, a lower elongated diffuser member, said diffuser members extending upstream from the leading edge of said wing, upper and lower bearings mounting said members to said wing, each of said diffuser members consisting of a hollow body having a wedge-shaped upstreamwardly pointing portion, a hollow tubular downstream portion, and an intermediate neck portion, said wedge-shaped and tubular portions forming arcuate grooves therebetween adjacent said neck portion slidably engaging said skins and said walls, the said bearings being arranged to provide vertically spaced spanwise pivot axes for said diffuser members.

3. A leading edge adjustable ram air inlet diffuser mechanism for aircraft including an airfoil having upper and lower skins, a pair of spaced elongated upper and lower diffuser members, said members being wedge-shaped in cross section, each of said members having a wedge edge pointing upstream, bearings mounting said diffuser members to the upstream edge of said airfoil, control means for operating each of said wedge-shaped diffuser members, and an air stream engine having an upstream supply duct, said duct having upper and lower walls spaced inwardly from said skins, a slot located in the top and bottom of each said diffuser members, each of said slots having a downstream facing opening and being substantially parallel with the lateral axis of said airfoil and slidably receiving the leading edge portions of the said skins and said walls.

4. The structure as claimed in 3 wherein said slots are arcuate-shaped in cross section and said leading edge portions are correspondingly shaped to fit into said slots.

5. A leading edge air inlet diffuser mechanism for aircraft including an airfoil, a pair of spaced elongated upper and lower diffuser members, said members being wedge-shaped in cross section, each member having a wedge edge pointing upstream, bearings mounting said members to the upstream edge of said airfoil, control means for adjusting the angular position of each of said members on said bearings, at least one pair of plates disposed in substantially vertical planes, each plate extending toward the other diffuser member, and both plates being at right angles to the lateral axis of the aircraft, said pair including one plate mounted on one of said diffuser members and another plate mounted on the other of said diffuser members, said airfoil having an air inlet adapted to be opened in varying amounts or closed by said diffuser members as adjusted by said control means, an air stream engine located within said airfoil, and a duct connecting said air inlet to said air stream engine, said pair of plates being arranged to overlap each other in their normal operating positions.

6. An adjustable area inlet diffuser mechanism for aircraft including an airfoil having upper and lower skins with leading edges, an air supply duct having leading edges, said duct having upper and lower walls spaced inwardly from said skins, a pair of spaced elongated upper and lower diffuser members, said members being wedge-shaped in cross section, each of said members having a wedge edge pointing upstream, bearings mounting said members to the upstream edge of said airfoil, an air inlet control means for adjusting the angular position of each of said members on said bearings, said bearings being recessed into said upper and lower diffuser members flush with the inside surfaces of said skins and said walls.

7. A leading edge air inlet diffuser mechanism for aircraft including a wing, a pair of spaced elongated upper and lower diffuser members, each of said members consisting of a hollow part wedge-shaped in cross ssection secured in spaced relation to a hollow shaft part, each diffuser member having a wedged edge pointing in the forward direction of travel of the aircraft, bearings mounting said diffuser members to the leading edge of said wing, control means for simultaneously adjusting said diffuser members on said bearings toward and away from each other whereby to adjust the amount of opening between said wedge edges, an airstream engine located within said wing, and a duct connecting said air inlet to said engine, said wing and said duct having separate independent arcuate surfaces adjacent their leading edges for slidably joning said wing and said duct to said hollow shaft part downstream of said hollow wedge-shaped part.

References Cited in the file of this patent

UNITED STATES PATENTS

| Number | Name | Date |
|---|---|---|
| 410,491 | Case | Sept. 3, 1889 |
| 938,230 | Hamilton | Oct. 26, 1909 |
| 1,588,000 | Barr | June 8, 1926 |
| 1,776,877 | Yonkese | Sept. 30, 1930 |
| 1,831,039 | Sikorsky | Nov. 10, 1931 |
| 1,967,777 | Minshall | June 24, 1934 |
| 1,978,640 | Markey | Oct. 30, 1934 |
| 2,081,436 | Martin | May 25, 1937 |
| 2,149,298 | Kuzelka | Mar. 7, 1939 |
| 2,294,367 | Fleming | Sept. 1, 1942 |
| 2,345,143 | Nakagawa | Mar. 28, 1944 |
| 2,363,550 | Reichert | Nov. 28, 1944 |
| 2,365,781 | Smith | Dec. 26, 1944 |
| 2,381,957 | Ibarra | Aug. 14, 1945 |
| 2,382,835 | Watter | Aug. 14, 1945 |
| 2,420,323 | Meyer | May 13, 1947 |
| 2,421,870 | Dornier | June 10, 1947 |
| 2,429,992 | Crispell | Nov. 4, 1947 |
| 2,441,488 | Howell | May 11, 1948 |
| 2,465,099 | Johnson | Mar. 22, 1949 |
| 2,470,348 | Haight | May 17, 1949 |
| 2,479,487 | Goembel | Aug. 16, 1949 |
| 2,480,036 | Lloyd | Aug. 23, 1949 |
| 2,499,401 | Madden | Mar. 7, 1950 |
| 2,503,973 | Smith | Apr. 11, 1950 |
| 2,573,834 | Davidson | Nov. 6, 1951 |
| 2,577,919 | Roy | Dec. 11, 1951 |
| 2,580,591 | Pouit | Jan. 1, 1952 |
| 2,584,198 | Griffith | Feb. 5, 1952 |
| 2,595,504 | Avery | May 6, 1952 |

FOREIGN PATENTS

| Number | Country | Date |
|---|---|---|
| 607,686 | Great Britain | Sept. 3, 1948 |
| 925,943 | France | Apr. 14, 1947 |

OTHER REFERENCES

"Aviation," issue of October 1945, pp. 172, 173, 244-74.5.